United States Patent
Kounosu et al.

(10) Patent No.: US 10,208,724 B2
(45) Date of Patent: Feb. 19, 2019

(54) FUEL SUPPLY DEVICE AND FUEL SUPPLY METHOD

(71) Applicant: Mitsui Engineering & Shipbuilding Co., Ltd., Chuo-ku, Tokyo (JP)

(72) Inventors: Makoto Kounosu, Chuo-ku, Tokyo (JP); Seiichi Kitamura, Tamano (JP); Renzo Kanda, Tokyo (JP)

(73) Assignee: Mitsui E&S Machinery Co., LTD (JP)

( * ) Notice: Subject to any disclaimer, the term of this patent is extended or adjusted under 35 U.S.C. 154(b) by 0 days.

(21) Appl. No.: 15/566,686

(22) PCT Filed: Apr. 13, 2016

(86) PCT No.: PCT/JP2016/061867
§ 371 (c)(1),
(2) Date: Oct. 13, 2017

(87) PCT Pub. No.: WO2016/167266
PCT Pub. Date: Oct. 20, 2016

(65) Prior Publication Data
US 2018/0128225 A1    May 10, 2018

(30) Foreign Application Priority Data
Apr. 13, 2015 (JP) .................. 2015-081545

(51) Int. Cl.
*F02M 59/08* (2006.01)
*F02M 59/10* (2006.01)
(Continued)

(52) U.S. Cl.
CPC ............ *F02M 59/10* (2013.01); *F02M 59/08* (2013.01); *F02M 59/105* (2013.01);
(Continued)

(58) Field of Classification Search
CPC ...... F02M 59/08; F02M 59/105; F02M 59/26; F02M 59/10; F02M 59/20; F02M 59/30; F04B 9/105; F04B 2015/081; F04B 49/12
(Continued)

(56) References Cited

U.S. PATENT DOCUMENTS 3,938,425 A * 2/1976 Kroffke .................. F04B 9/107
                                                    417/274
2002/0085921 A1   7/2002 Gram et al.
(Continued)

FOREIGN PATENT DOCUMENTS

JP    S51-003404    1/1976
JP    S62-232563    10/1987
(Continued)

OTHER PUBLICATIONS

International Search Report for International Application No. PCT/JP2016/061867 dated May 17, 2016, 4 pages, Japan.

*Primary Examiner* — Mahmoud Gimie
(74) *Attorney, Agent, or Firm* — Thorpe North & Western (57) ABSTRACT

A fuel supply device includes: a linear actuator; a reciprocating pump having a boosting piston driven by the linear actuator and configured to reciprocate in an axial direction, the reciprocating pump being configured to suck the fuel when the boosting piston moves in a first direction and configured to boost and eject the fuel when the boosting piston moves in a second direction; and a controller configured to control driving of the linear actuator so as to adjust an amount of the fuel ejected from a boosting cylinder per reciprocating time by adjusting a ratio of a fuel ejection time and a fuel suction time of the reciprocating pump without changing the reciprocating time of the boosting piston in accordance with a load of the internal combustion engine. The adjustment adjusts a stroke length of the boosting piston (Continued)

and a moving speed of the boosting piston in the second direction.

20 Claims, 5 Drawing Sheets (51) Int. Cl.
- *F02M 59/20* (2006.01)
- *F02M 59/26* (2006.01)
- *F04B 15/08* (2006.01)
- *F04B 9/105* (2006.01)
- *F04B 49/06* (2006.01)
- *F04B 49/12* (2006.01)
- *F04B 13/00* (2006.01)
- *F04B 53/10* (2006.01)
- *F02M 59/30* (2006.01)

(52) U.S. Cl.
CPC ............ *F02M 59/20* (2013.01); *F02M 59/26* (2013.01); *F04B 9/105* (2013.01); *F04B 15/08* (2013.01); *F04B 49/065* (2013.01); *F04B 49/12* (2013.01); *F02M 59/30* (2013.01); *F02M 2200/245* (2013.01); *F04B 13/00* (2013.01); *F04B 53/10* (2013.01); *F04B 2201/0202* (2013.01); *F04B 2201/0206* (2013.01); *F04B 2201/0209* (2013.01); *F04B 2201/0601* (2013.01); *F04B 2203/09* (2013.01); *Y02T 10/123* (2013.01)

(58) Field of Classification Search
USPC ........ 123/495, 497, 500, 504; 417/245, 254, 417/410.1
See application file for complete search history.

(56) References Cited

U.S. PATENT DOCUMENTS

| 2004/0105759 | A1  | 6/2004  | Gram et al. |
| 2005/0180864 | A1* | 8/2005  | Ursan .................... F04B 9/107 417/390 |
| 2009/0071974 | A1  | 3/2009  | Ikushima |
| 2013/0104631 | A1  | 5/2013  | Tokuo et al. |
| 2015/0369228 | A1  | 12/2015 | Kounosu et al. |
| 2016/0281666 | A1* | 9/2016  | Coldren ................. F02M 59/10 |
| 2018/0080413 | A1* | 3/2018  | Kounosu ............ F02M 21/0218 |

FOREIGN PATENT DOCUMENTS

| JP | H06-117228    | 4/1994  |
| JP | H07-324676    | 12/1995 |
| JP | 2000-130353   | 5/2000  |
| JP | 2003-510515   | 3/2003  |
| JP | 3519089       | 4/2004  |
| JP | 2005-042619   | 2/2005  |
| JP | 2005-504927   | 2/2005  |
| JP | 4711328       | 6/2011  |
| JP | 5519857       | 6/2014  |
| WO | WO 1998/54461 | 12/1998 |
| WO | WO 2001/23752 | 4/2001  |
| WO | WO 2003/031817| 4/2003  |
| WO | WO 2006/085433| 8/2006  |
| WO | WO 2012/014741| 2/2012  |
| WO | WO 2015/099106| 7/2015  |

* cited by examiner

FUEL SUPPLY DEVICE AND FUEL SUPPLY METHOD

TECHNICAL FIELD

The present technology relates to a fuel supply device and a fuel supply method for supplying fuel to an internal combustion engine such as a diesel engine.

BACKGROUND ART

In conventional ships, a two-stroke low speed diesel engine is used. The diesel engine can output at low speeds and is driven, directly connected to a propeller.

In recent years, natural gas with low $NO_x$ and $SO_x$ emissions has received attention as a fuel for low speed diesel engines. By injecting high pressure natural gas as a fuel into a combustion chamber of a low speed diesel engine and burning it, an output can be obtained with high heat efficiency.

For example, a reciprocating pump is driven by converting the rotational motion to the reciprocating motion using a crankshaft. In a case where a piston of the reciprocating pump is driven using the crankshaft, since the piston stroke is determined by the crankshaft, it is not possible to freely adjust the piston stroke. In addition, in a case where a plurality of reciprocating pumps is driven by an identical crankshaft, it is difficult to independently control the individual reciprocating pumps.

Meanwhile, Japanese Unexamined Patent Application Publication No. 2005-504927 ("JP 2005-504927") describes a device that boosts liquid fuel using a reciprocating pump and supplies the boosted fuel to the engine. In the device in JP 2005-504927, a piston of the reciprocating pump is driven in the left-right direction, and a "linear hydraulic motor" (hydraulic cylinder unit) is used as a linear actuator that drives a piston. In JP 2005-504927, the moving direction of the piston of the reciprocating pump is switched by switching, with a direction switching valve, the direction of the hydraulic oil supplied from the hydraulic pump to the hydraulic cylinder unit. With the use of the hydraulic cylinder unit, it is possible to drive the reciprocating pump at a lower speed than the case where the crankshaft is used. Moreover, this method has an advantage that the piston stroke can be controlled so as to allow the piston to move at a constant speed.

Meanwhile, in a case of adjusting the fuel supply amount in accordance with the load of an internal combustion engine in a fuel supply device configured to supply fuel to the internal combustion engine using a reciprocating pump driven by a crankshaft, there is a need to change a reciprocating cycle of the reciprocating pump. Unfortunately, however, changing the reciprocating cycle of the reciprocating pump might induce fluctuation of the pressure and the flow rate of the fuel according to the reciprocating cycle, leading to a difficulty in achieving an optimum flow rate, particularly when the output is low.

In the case of the crankshaft driven reciprocating pump, in particular, lubrication conditions of a joining rod for a cylinder side bearing can be very critical in slow rotation because the load from the joining rod is kept in one direction, leading to a high possibility of generating abnormal abrasion of the bearing and seizure. To avoid this, in a case where a low output is needed in the crankshaft driven reciprocating pump, bypassing a surplus amount to the necessary amount while the pump ejection amount keeps too much is required. This often causes a power loss.

SUMMARY

The present technology provides a fuel supply device and a fuel supply method capable of flexibly adjusting the supply amount of fuel ejected from a reciprocating pump without changing the reciprocating periodic time of the reciprocating pump.

The first aspect of the technology is a fuel supply device for supplying fuel into a combustion chamber of an internal combustion engine. The fuel supply device includes:

a linear actuator;

a reciprocating pump having a boosting cylinder and a boosting piston driven by the linear actuator and configured to reciprocate in an axial direction, the reciprocating pump being configured to suck the fuel into the boosting cylinder when the boosting piston moves in a first direction in the axial direction and configured to boost and eject the fuel from the boosting cylinder when the boosting piston moves in a second direction in the axial direction; and a controller configured to control driving of the linear actuator, the controller being configured to control the linear actuator so as to adjust an amount of the fuel ejected from the boosting cylinder per reciprocating time by adjusting a ratio of a fuel ejection time and a fuel suction time of the reciprocating pump without changing the reciprocating time of the boosting piston in accordance with a load of the internal combustion engine, and configured to perform adjustment of the ratio of the fuel ejection time and the fuel suction time by adjusting a stroke length of the boosting piston and a moving speed of the boosting piston in the second direction in accordance with the load of the internal combustion engine.

The second aspect of the technology is also a fuel supply device for supplying fuel into a combustion chamber of an internal combustion engine. The fuel supply device includes:

a low pressure fuel supply pipe configured such that a low pressure fuel is supplied;

a high pressure fuel supply pipe configured such that high pressure fuel to be supplied into the combustion chamber is supplied;

a plurality of fuel supply units provided between the low pressure fuel supply pipe and the high pressure fuel supply pipe, each of the fuel supply units being configured to boost the fuel in the low pressure fuel supply pipe and supply the boosted fuel to the high pressure fuel supply pipe; and a control unit configured to control the plurality of fuel supply units, each of the fuel supply units including:

a linear actuator;

a reciprocating pump having a boosting cylinder and a boosting piston driven by the linear actuator and configured to reciprocate in an axial direction, the reciprocating pump being configured to suck the fuel into the boosting cylinder when the boosting piston moves in a first direction in the axial direction and configured to boost and eject the fuel from the boosting cylinder when the boosting piston moves in a second direction in the axial direction; and a controller configured to control driving of the linear actuator.

The control unit is configured to control, via the controller, the linear actuator so as to change a total amount of the fuel ejected from each boosting cylinder per reciprocating time by adjusting a ratio of a fuel ejection time and a fuel suction time of the reciprocating pump without changing the reciprocating time of the boosting piston in accordance with a load of the internal combustion engine. The control unit is configured to perform, via the controller, adjustment of the ratio of the fuel ejection time and the fuel suction time by adjusting a stroke length of the boosting piston and a moving speed of the boosting piston in the second direction in accordance with the load of the internal combustion engine.

A least one stroke length of the boosting piston is preferably adjusted to be different from a stroke length of another boosting piston.

The control unit is preferably configured to adjust a timing at which fuel is ejected from the boosting cylinder by adjusting the moving speed of the boosting piston in the second direction and the stroke length of the boosting piston.

The stroke length is preferably set from a position of the boosting piston at which a volume in the boosting cylinder is minimized.

The stroke length is preferably adjusted to be a length corresponding to a fuel amount needed by the internal combustion engine.

Preferably, the linear actuator is a hydraulic cylinder unit, the hydraulic cylinder unit including:

a hydraulic cylinder having a hydraulic fluid accommodation space for accommodating hydraulic fluid and arranged such that an axial direction of the hydraulic cylinder is aligned with the axial direction of the boosting piston;

a hydraulic piston movably arranged in the axial direction within the hydraulic cylinder, and configured to partition the hydraulic fluid accommodation space into a first chamber and a second chamber;

a piston rod configured to couple the hydraulic piston with the boosting piston;

a hydraulic pump configured to move the hydraulic piston in a first direction in the axial direction by supplying hydraulic fluid to the first chamber and to move the hydraulic piston in a second direction in the axial direction by supplying hydraulic fluid to the second chamber; and an electric motor configured to drive the hydraulic pump such that the hydraulic piston reciprocates in the axial direction, and the controller is configured to control a movement of the hydraulic piston within the hydraulic cylinder by controlling the electric motor.

Preferably, the hydraulic cylinder unit further includes:

a first hydraulic pipe with an internal space closed therein, the first hydraulic pipe having one end connected to the hydraulic pump and the other end connected to the first chamber and configured to direct all the hydraulic fluid ejected from the hydraulic pump toward the first chamber for supply and configured to return all the hydraulic fluid discharged from the first chamber toward the hydraulic pump; and a second hydraulic pipe with an internal space closed therein, the second hydraulic pipe having one end connected to the hydraulic pump and the other end connected to the second chamber and configured to direct all the hydraulic fluid ejected from the hydraulic pump toward the second chamber for supply and configured to return all the hydraulic fluid discharged from the second chamber toward the hydraulic pump, and the hydraulic pump is configured to direct all the hydraulic fluid returned to the hydraulic pump toward one of the first chamber and the second chamber for supply.

The fuel supply device preferably further includes a position sensor for detecting a position of the boosting piston. A position signal of the boosting piston output from the position sensor is preferably used by the controller for adjusting a stroke length or a moving speed of the boosting piston.

Preferably, the linear actuator is an electric cylinder unit, and includes:

an electric motor;

a ball nut configured to rotate by the power of the electric motor; and a ball screw to which the ball nut is screwed, being coupled with the boosting piston, an axial direction of the ball screw being aligned with the axial direction of the boosting piston, and configured to move in the axial direction by rotation of the ball nut, and the controller is configured to control the movement of the ball screw in the axial direction by controlling the electric motor.

The third aspect of the technology is a fuel supply method for supplying fuel into a combustion chamber of an internal combustion engine. The method includes the steps of:

allowing reciprocating movement of a boosting piston driven by a linear actuator in an axial direction, sucking the fuel into a boosting cylinder when the boosting piston moves in a first direction in the axial direction, and boosting and ejecting the fuel from the boosting cylinder when the boosting piston moves in a second direction in the axial direction; and adjusting an amount of the fuel ejected from the boosting cylinder per reciprocating time of the boosting piston in accordance with a load of the internal combustion engine by adjusting a ratio of a fuel ejection time and a fuel suction time without changing the reciprocating time, the ratio of the fuel ejection time and the fuel suction time being adjusted by adjusting, through the linear actuator, a stroke length of the boosting piston and a moving speed of the boosting piston in the second direction in accordance with the load of the internal combustion engine.

The fourth aspect of the technology is a fuel supply method for supplying fuel into a combustion chamber of an internal combustion engine. The method includes the steps of:

allowing reciprocating movements of boosting pistons driven by a plurality of linear actuators respectively in an axial direction, sucking the fuel into boosting cylinders respectively when the boosting pistons move in a first direction in the axial direction, and boosting and ejecting the fuel from the boosting cylinders respectively when the boosting pistons move in a second direction in the axial direction; and changing a total amount of the fuel ejected from the boosting cylinders per reciprocating time of the boosting pistons in accordance with a load of the internal combustion engine by adjusting, by controlling at least one of the linear actuators, a ratio of a fuel ejection time and a fuel suction time without changing the reciprocating time of the boosting pistons, the ratio of the fuel ejection time and the fuel suction time being adjusted by adjusting a stroke length of at least one of the boosting pistons and a moving speed of at least one of the boosting pistons in the second direction in accordance with the load of the internal combustion engine.

At least one stroke length of the boosting piston is preferably adjusted to be different from a stroke length of another boosting piston.

A timing at which fuel is ejected from the boosting cylinder is preferably adjusted by adjusting the moving speed of the boosting piston in the second direction and the stroke length of the boosting piston.

The stroke length is preferably set from a position of the boosting piston at which a volume in the boosting cylinder is minimized.

The linear actuator is a preferably hydraulic cylinder unit, the hydraulic cylinder unit including:

a hydraulic cylinder having a hydraulic fluid accommodation space for accommodating hydraulic fluid and arranged such that an axial direction of the hydraulic cylinder is aligned with the axial direction of the boosting piston;

a hydraulic piston movably arranged in the axial direction within the hydraulic cylinder, and configured to partition the hydraulic fluid accommodation space into a first chamber and a second chamber;

a piston rod configured to couple the hydraulic piston with the boosting piston;

a hydraulic pump configured to move the hydraulic piston in a first direction in the axial direction by supplying hydraulic fluid to the first chamber and to move the hydraulic piston in a second direction in the axial direction by supplying hydraulic fluid to the second chamber; and an electric motor configured to drive the hydraulic pump such that the hydraulic piston reciprocates in the axial direction, and the step of boosting and ejecting the fuel includes controlling a movement of the hydraulic piston within the hydraulic cylinder by controlling the electric motor.

Preferably, the step of boosting and ejecting the fuel includes:

returning all the hydraulic fluid discharged from the second chamber toward the hydraulic pump and ejecting and directing all the hydraulic fluid returned toward the hydraulic pump to the first chamber for supply; and returning all the hydraulic fluid discharged from the first chamber toward the hydraulic pump and ejecting and directing all the hydraulic fluid returned to the hydraulic pump to the second chamber for supply.

A position of the boosting piston is preferably detected when adjusting the stroke length of the boosting piston and the moving speed of the boosting piston, and a detection result of the position of the boosting piston is preferably used for adjusting one of the stroke length of the boosting piston and the moving speed of the boosting piston.

According to the present technology, it is possible to flexibly adjust the supply amount of fuel ejected from a reciprocating pump in accordance with the load of the internal combustion engine without changing the reciprocating time of the reciprocating pump.

DETAILED DESCRIPTION

Hereinafter, a fuel supply device according to an embodiment of the present technology will be described with reference to the drawings.

Figure 1:
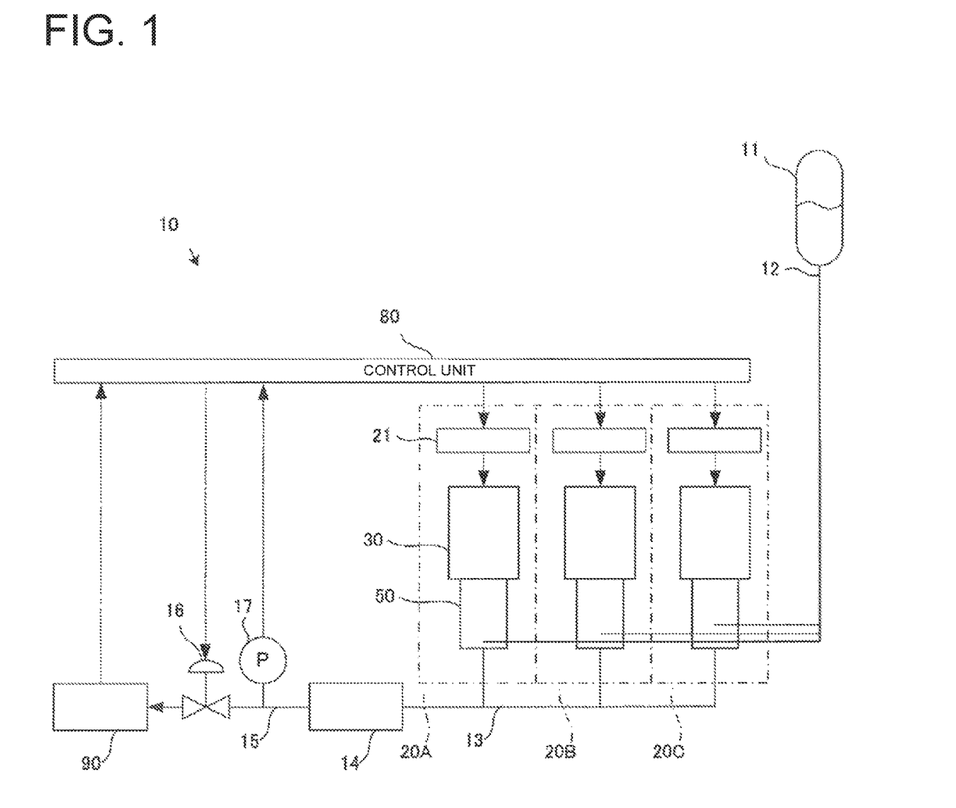
FIG. 1 is a schematic diagram of a configuration of a fuel supply device according to a present embodiment.

As illustrated in FIG. 1, a fuel supply device 10 of a present embodiment is a device that boosts and heats a liquid fuel and supply it into the combustion chamber of an internal combustion engine 90 by injecting the fuel at a high pressure. The internal combustion engine 90 is a prime mover that burns fuel in a combustion chamber in a cylinder and works with generated thermal energy, for example, a reciprocating engine, and a gas turbine. In particular, it is preferable to use as the internal combustion engine 90 a diesel engine that performs compression ignition of the fuel. The following embodiments describe a case where the internal combustion engine 90 is applied to a diesel engine mounted on a ship. Alternatively, the present technology can also be applied to a fuel supply device for a diesel engine other than a ship.

As illustrated in FIG. 1, the fuel supply device 10 includes a liquid fuel tank 11, a low pressure fuel supply pipe 12, a plurality of fuel supply units 20A, 20B, and 20C, a high pressure fuel supply pipe 13, a heat exchanger 14, a high temperature fuel supply pipe 15, a pressure regulating valve 16, a pressure gauge 17, and a control unit 80. All of these components of the fuel supply device 10 are mounted on a ship.

The liquid fuel tank 11 stores the fuel supplied to the internal combustion engine 90 in a liquid state. Examples of the liquid fuel stored in the liquid fuel tank 11 include liquefied methane, liquefied ethane, and liquefied propane. The liquid fuel tank 11 is connected to the low pressure fuel supply pipe 12 and supplies the liquid fuel to the fuel supply units 20A, 20B, and 20C via the low pressure fuel supply pipe 12.

The pressure of the liquid fuel in the low pressure fuel supply pipe 12 at a connecting portion with the fuel supply units 20A, 20B, and 20C is a pressure corresponding to the temperature and the height of the liquid surface of the liquid fuel in the liquid fuel tank 11, or the like. For the purpose of increasing this pressure to ensure a net positive suction head (NPSH), and to facilitate supply of liquid fuel to the fuel supply units 20A, 20B, and 20C, the liquid fuel tank 11 is arranged at a position higher than the fuel supply units 20A, 20B, and 20C.

Note that in a case where it is difficult to arrange the liquid fuel tank 11 at a high position, it is allowable to ensure the net positive suction head by increasing the pressure of the liquid fuel in the liquid fuel tank 11 using a booster pump for supplying the liquid fuel to the liquid fuel tank 11.

The fuel supply units 20A, 20B, and 20C are provided in parallel with each other at a position between the low pressure fuel supply pipe 12 and the high pressure fuel supply pipe 13. Each of the fuel supply units 20A, 20B, and 20C includes a controller 21, a linear actuator 30, and a reciprocating pump 50.

The reciprocating pump 50 boosts the liquid fuel supplied from the low pressure fuel supply pipe 12 and supplies the boosted liquid fuel to the heat exchanger 14 via the high pressure fuel supply pipe 13. The low pressure fuel supply pipe 12 and the high pressure fuel supply pipe 13 are detachable from the fuel supply units 20A, 20B and 20C.

The linear actuator 30 drives the piston of the reciprocating pump 50. By using the linear actuator 30, it is possible to drive the piston of the reciprocating pump 50 at a lower speed than in the case of using the crankshaft, and possible to control the drive of the piston so as to move at a constant speed at piston strokes except for times of the start of the liquid inflow of the reciprocating pump, the start of liquid boosting, and the end of the liquid boosting. Examples of the applicable linear actuator 30 include a hydraulic cylinder unit and an electric cylinder unit. A present embodiment will describe a case where a hydraulic cylinder unit is used as the linear actuator 30.

Controlled by a control signal input from the control unit 80, the controller 21 controls the linear actuator 30. Moreover, a position signal indicating the position of the piston of the reciprocating pump 50 is input into the controller 21 as described below. The controller 21 controls the linear actuator 30 such that the ejection amount of the reciprocating pump 50 is adjusted in accordance with the position signal.

Note that while the three fuel supply units 20A, 20B, and 20C are provided in parallel with each other between the low pressure fuel supply pipe 12 and the high pressure fuel supply pipe 13 in FIG. 1, the number of fuel supply units is not limited to this but can be flexibly changed in accordance with the amount of fuel to be supplied.

The inlet side of the heat exchanger 14 is connected to the high pressure fuel supply pipe 13, and the outlet side thereof is connected to the high temperature fuel supply pipe 15. The heat exchanger 14 heats the boosted liquid fuel supplied via the high pressure fuel supply pipe 13. As the heat source for heating the liquid fuel, for example, the combustion heat of the boil-off gas generated in the liquid fuel tank 11 can be used. For example, it is allowable to heat the liquid fuel by heat exchange with warm water heated by the combustion heat of the boil-off gas.

The high temperature fuel supply pipe 15 includes a pressure regulating valve 16, and one end of the high temperature fuel supply pipe 15 is connected to the heat exchanger 14 and the other end is connected to the combustion chamber of the internal combustion engine 90. After the liquid fuel heated by the heat exchanger 14 is then regulated by the pressure regulating valve 16 to a pressure within a predetermined range needed by the internal combustion engine 90, and thereafter the liquid fuel is supplied to the combustion chamber of the internal combustion engine 90 via the high temperature fuel supply pipe 15. The pressure regulating valve 16 is controlled by the control unit 80.

Note that the pressure within the predetermined range needed by the internal combustion engine 90 varies depending on the type and performance of the internal combustion engine 90. In a case where the internal combustion engine 90 is a low speed two-stroke diesel engine for a ship, the pressure within a predetermined range is, for example, 5 MPa to 100 MPa, preferably 20 MPa to 70 MPa, although the present technology is not limited thereto.

Moreover, the high temperature fuel supply pipe 15 includes the pressure gauge 17. The pressure gauge 17 measures the pressure in the high temperature fuel supply pipe 15 and outputs the measurement signal to the control unit 80.

A signal indicating the load of the internal combustion engine 90 is input from the internal combustion engine 90 into the control unit 80. The signal indicating the load of the internal combustion engine 90 is, for example, a signal indicating the rotation speed.

The control unit 80 adjusts the ejection amount of the reciprocating pump 50 by outputting a control signal to the fuel supply units 20A, 20B, and 20C. The ejection amount of the reciprocating pump 50 is adjusted such that the pressure in the high temperature fuel supply pipe 15 becomes a pressure corresponding to necessary load of the internal combustion engine 90.

Note that it is allowable to measure the rotation speed of a propelling propeller (not illustrated) driven by the internal combustion engine 90 and adjust the pressure in the high temperature fuel supply pipe 15 in accordance with the rotation speed.

The liquid fuel tank 11, the low pressure fuel supply pipe 12, the linear actuator 30, the reciprocating pump 50, the high pressure fuel supply pipe 13, the heat exchanger 14, the high temperature fuel supply pipe 15, the pressure regulating valve 16, and the pressure gauge 17 are arranged at hazardous areas. In contrast, the controller 21 and the control unit 80 are generally non-explosion-proof products. In a case where they are not explosion-proof, they should be arranged in a non-hazardous area separated from the hazardous areas by explosion-proof walls, or should be arranged in a non-explosion-proof area sufficiently away from the hazardous areas.

Next, with reference to FIGS. 2 and 3, a specific configuration of the linear actuator 30 and the reciprocating pump 50 using a servo motor as the electric motor will be described in detail. While the following description is a case where a hydraulic cylinder unit is used as the linear actuator 30, the linear actuator 30 is not limited to a hydraulic cylinder unit.

Figure 2:
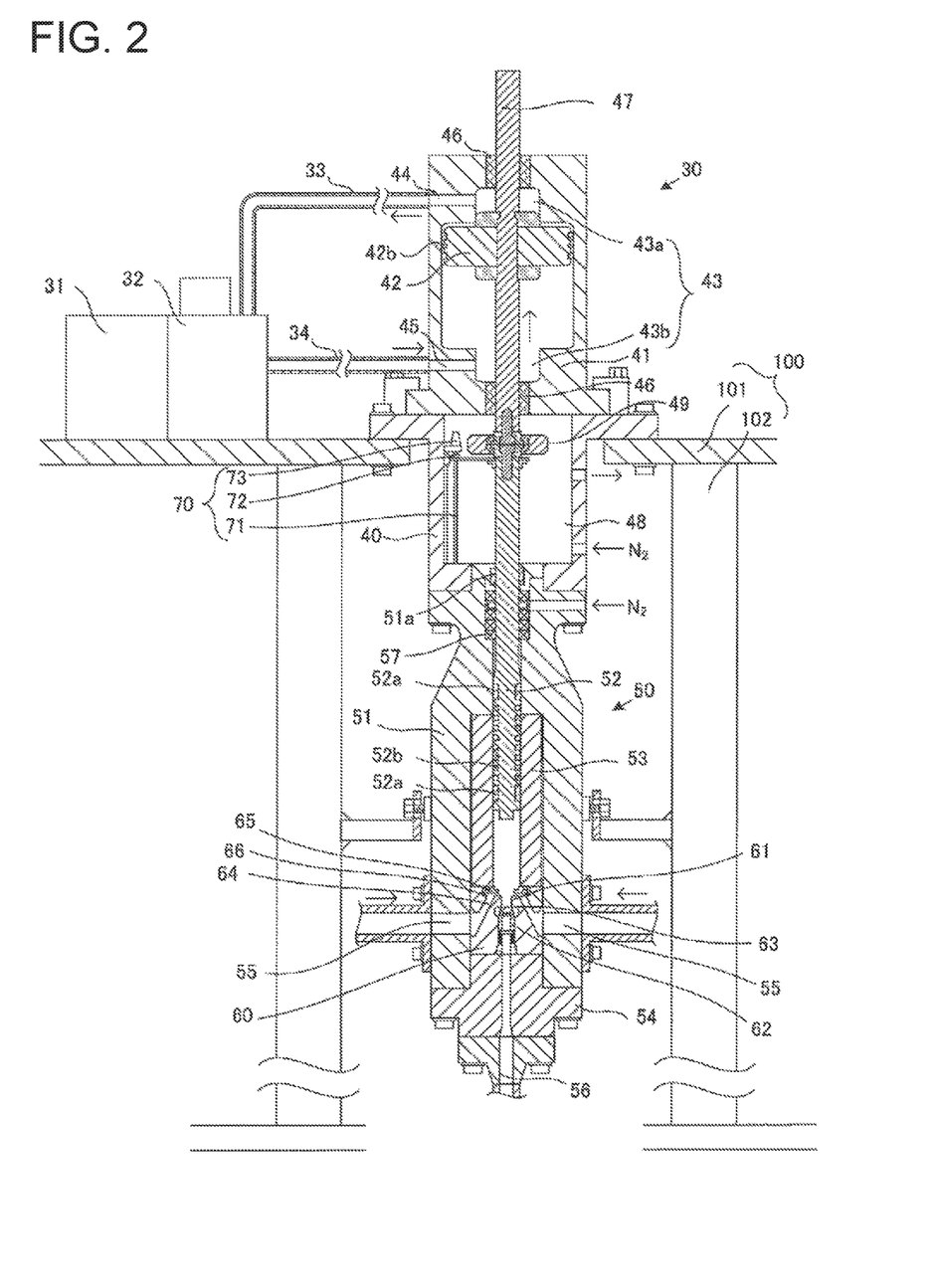
FIG. 2 is a cross-sectional view of a linear actuator and a reciprocating pump at the time of fuel suction according to a present embodiment.
Figure 3:
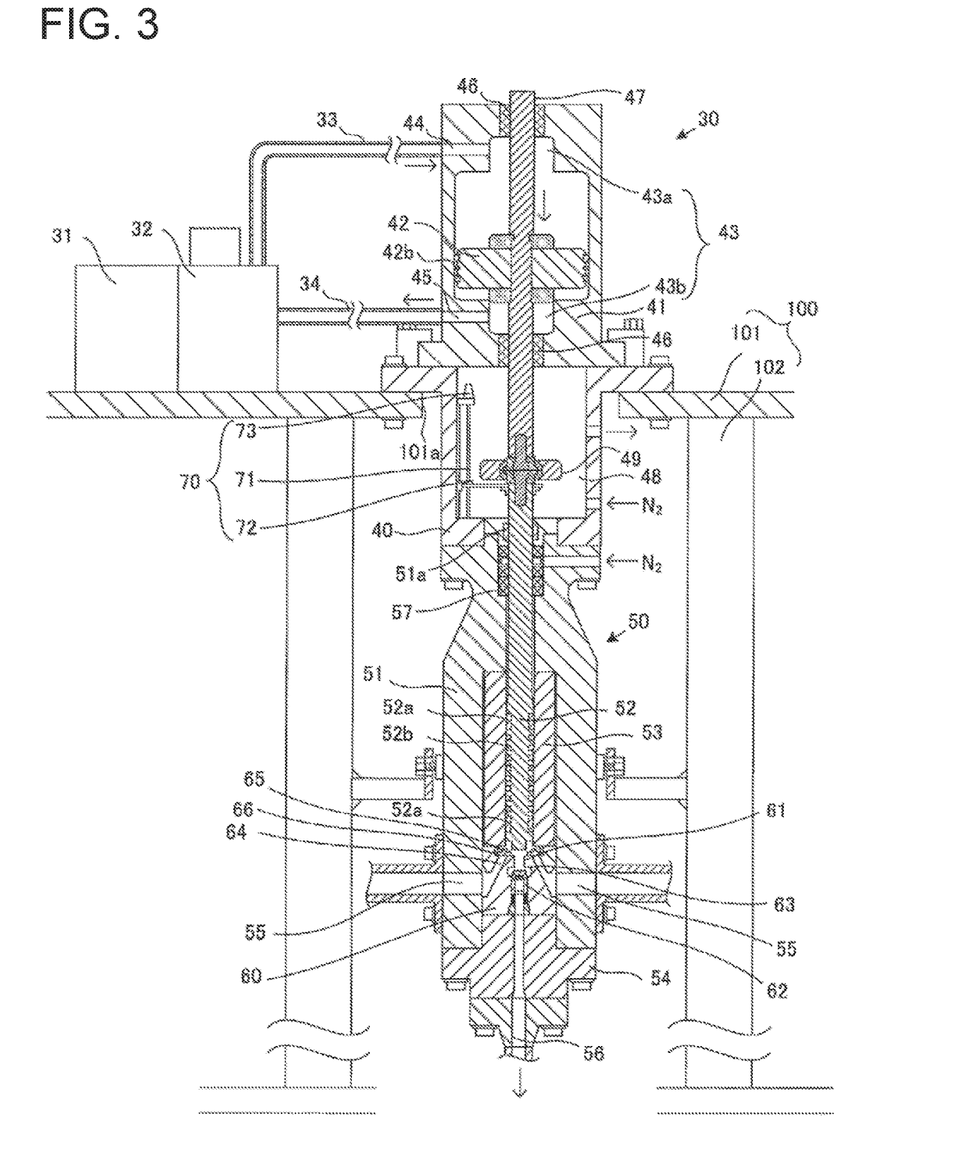
FIG. 3 is a cross-sectional view of the linear actuator and the reciprocating pump at the time of ejecting fuel according to a present embodiment.

In FIGS. 2 and 3, the up-down direction corresponds to the vertical direction, and the left-right direction corresponds to the horizontal direction. In the following description, the upward direction in the vertical direction will be referred to as "upper" (or "above"), a portion in the upper direction as "upper portion", the lower direction in the vertical direction as "lower" (or "below"), and a portion in the lower direction as "lower portion". The following will describe the linear actuator 30 and the reciprocating pump 50 arranged so as to allow the axial direction to be aligned with the vertical direction. The present technology, however, is not limited to this, and it is allowable to use the linear actuator 30 and the reciprocating pump 50 arranged such that the axial direction comes in the horizontal direction or in an angled direction.

In the present embodiment, the linear actuator 30 and the reciprocating pump 50 are arranged with the axial direction oriented in the vertical direction. Note that while FIGS. 2 and 3 illustrate an example in which the reciprocating pump 50 is arranged below the linear actuator 30, the reciprocating pump 50 may be arranged above the linear actuator 30.

[Hydraulic Cylinder Unit]

As illustrated in FIGS. 2 and 3, the hydraulic cylinder unit (linear actuator 30) includes an electric motor 31, a hydraulic pump 32, a first hydraulic pipe 33, a second hydraulic pipe 34, a fixed portion 40, a hydraulic cylinder 41, and a hydraulic piston 42.

The hydraulic cylinder unit is provided on a top plate 101 of a cradle 100. The top plate 101 is supported by a leg 102, and the leg 102 is fixed to a structure such as a deck or an inner bottom plate of the hull.

The electric motor 31 is provided at an upper portion of the top plate 101. The electric motor 31 is controlled by the controller 21 and drives the hydraulic pump 32. An inverter motor or a servo motor is used as the electric motor 31, for example.

The hydraulic pump 32 is provided at an upper portion of the top plate 101. The hydraulic pump 32 is driven by the electric motor 31, and supplies hydraulic fluid into the hydraulic cylinder 41, thereby moving the hydraulic piston 42 in the vertical direction. Examples of the applicable hydraulic fluid include petroleum-based hydraulic oil, synthetic hydraulic fluid, and water-formed hydraulic fluid.

The hydraulic pump 32 is connected with the first hydraulic pipe 33 and the second hydraulic pipe 34. The hydraulic pump 32 is driven by the electric motor 31.

In a case where the electric motor 31 is a servo motor, the direction in which the hydraulic fluid is ejected from the hydraulic pump 32 is switched in accordance with the forward-reverse rotational directions of the electric motor 31. For example, during forward rotation of the electric motor 31, the hydraulic pump 32 sucks the hydraulic fluid in the first hydraulic pipe 33 and ejects the sucked hydraulic fluid to the second hydraulic pipe 34. Moreover, during reverse rotation of the electric motor 31, the hydraulic pump 32 sucks the hydraulic fluid in the second hydraulic pipe 34 and ejects the sucked hydraulic fluid to the first hydraulic pipe 33. In this case, the direction switching valve is unnecessary for the first hydraulic pipe 33 and the second hydraulic pipe 34.

In contrast, in a case where the electric motor 31 is an inverter motor, the direction in which the hydraulic fluid flows is changed by a direction switching valve (not illustrated) provided in the first hydraulic pipe 33 and the second hydraulic pipe 34.

Note that the flow rate and pressure of the hydraulic fluid in the first hydraulic pipe 33 and the second hydraulic pipe 34 are determined by the ejection amount of the hydraulic pump 32. In any case where the electric motor 31 is a servo motor and the electric motor 31 is an inverter motor, the flow rate and pressure of the hydraulic fluid can be adjusted by the rotation speed of the electric motor 31.

The fixed portion 40 is fixed to the top plate 101, arranged in the opening 101a provided on the top plate 101. The hydraulic cylinder 41 is fixed at an upper portion of the fixed portion 40, and the reciprocating pump 50 is fixed to the lower portion of the fixed portion 40. The fixed portion 40 is hollow cylinder and internally includes a cavity 48.

The hydraulic cylinder 41 includes a hydraulic fluid accommodation space 43 for accommodating hydraulic fluid and is mounted on the top surface of the top plate 101 such that the axial direction comes in the vertical direction. Moreover, a side wall of the hydraulic cylinder 41 includes an upper through hole 44 communicating with the upper end portion of the hydraulic fluid accommodation space 43 and a lower through hole 45 communicating with the lower end portion of the hydraulic fluid accommodation space 43. An outer opening portion of the upper through hole 44 is connected to the first hydraulic pipe 33, and an outer opening portion of the lower through hole 45 is connected to the second hydraulic pipe 34.

The hydraulic piston 42 includes a piston ring 42b. The hydraulic piston 42 includes a rider ring 51a vertically movably accommodated in the hydraulic fluid accommodation space 43 while allowing the piston ring 42b to be in contact with the inner wall surface of the hydraulic fluid accommodation space 43 of the hydraulic cylinder 41. The rider ring 51a has a function of correcting deflection in the horizontal direction when the hydraulic piston 42 moves in the vertical direction. The piston ring 42b has a function of closing a gap between the hydraulic piston 42 and the inner wall surface of the hydraulic fluid accommodation space 43.

The hydraulic piston 42 partitions the hydraulic fluid accommodation space 43 into an upper chamber 43a above the hydraulic piston 42 and a lower chamber 43b below the hydraulic piston 42.

The hydraulic piston 42 is of a double rod type and includes a piston rod 47 protruding to the outside from the upper portion and the lower portion of the hydraulic cylinder 41. The piston rod 47 moves up and down together with the hydraulic piston 42. Since the hydraulic piston 42 is a double rod type, the decrease amount in the volume of the upper chamber 43a when the hydraulic piston 42 moves upward is equal to the increase amount in the volume of the lower chamber 43b. The hydraulic piston 42 may be a single rod type. In this case, however, it is desirable to provide a pulsation prevention tank because pressure fluctuation occurs due to a change in the amount of hydraulic fluid that moves.

A bush 46 is provided at a portion of the hydraulic cylinder 41 through which the piston rod 47 passes. An oil seal is incorporated in the bush 46. The bush 46 supports the piston rod 47 such that it can move up and down, and prevents the hydraulic fluid from leaking out of the hydraulic fluid accommodation space 43.

The cavity 48 includes a coupling portion 49 connecting the lower end portion of the piston rod 47 with the upper end portion of the boosting piston 52 of the reciprocating pump 50. The coupling portion 49 moves up and down within the cavity 48 together with the up-down motion of the piston rod 47. Note that the coupling portion 49 has a function of adjusting the axial misalignment of the piston rod 47 of the hydraulic cylinder with the piston 52 of the reciprocating pump 50.

From the viewpoint of preventing gas leakage from the reciprocating pump 50, nitrogen gas at room temperature is externally supplied to the cavity 48. The nitrogen gas may be supplied to a rod packing portion 57 of the reciprocating pump 50. With the cavity 48, it is possible to suppress heat conduction to the low temperature heat source (liquid fuel) in the reciprocating pump 50 and to prevent the high temperature heat source (hydraulic fluid) in the hydraulic fluid accommodation space 43 from being cooled via the piston rod 47. Note that it is allowable to prevent the high temperature heat source from being cooled by installing an explosion-proof heater or an endothermic fin.

[Reciprocating Pump]

As the reciprocating pump 50, it is possible to use, for example, a reciprocating pump having a structure similar to that described in JP 5519857 B.

More specifically, the reciprocating pump 50 includes a boosting cylinder 51, the boosting piston 52, a cylinder liner 53, a cover 54, and a valve box 60.

The upper end portion of the boosting cylinder 51 is fixed to the lower end portion of the fixed portion 40. The side wall of the boosting cylinder 51 is fixed to the leg 102 of the cradle 100. The rod packing portion 57 is provided on an upper-side portion of the boosting cylinder 51.

The boosting cylinder 51 has an internal space for accommodating the boosting piston 52, the cylinder liner 53, and the valve box 60. The cover 54 is fixed to the lower end portion of the boosting cylinder 51. The cylinder liner 53 and the valve box 60 are fixed within the boosting cylinder 51 by the cover 54.

A suction port 55 is provided on the side wall of the boosting cylinder 51 at a height position at which the valve box 60 is fixed inside. The suction port 55 is connected with the low pressure fuel supply pipe 12.

The cover 54 includes an ejection port 56 penetrating in the vertical direction. The ejection port 56 is connected with the high pressure fuel supply pipe 13.

Note that the valve box 60 is provided below the boosting piston 52, and fuel is sucked into the lower portion of the boosting piston 52 inside the boosting cylinder 51 when the boosting piston 52 is moved vertically upward. With this configuration, it is possible to arrange the suction port 55 of the reciprocating pump 50 at a lower position. The pressure of the liquid fuel in the low pressure fuel supply pipe 12 at the connecting portion with the suction port 55 is a pressure proportional to the difference between the height of the liquid surface of the liquid fuel in the liquid fuel tank 11 and the height of the suction port 55. Accordingly, by arranging the suction port 55 at a lower position, it is possible to increase the pressure of the liquid fuel in the low pressure fuel supply pipe 12 at the connecting portion with the suction port 55. This facilitates supply of the fuel from the suction port 55 into the boosting cylinder 51.

The upper end portion of the boosting piston 52 is coupled to the lower end portion of the piston rod 47 by the coupling portion 49, and the boosting piston 52 moves up and down in conjunction with the piston rod 47.

Moreover, a position sensor is provided at the upper end portion of the boosting piston 52. The position sensor detects the position of the boosting piston 52 in the vertical direction and outputs the position signal to the controller 21. This position signal is used in the controller 21 to adjust the stroke length of the boosting piston 52 and the moving speed of the boosting piston 52. Moreover, as will be described below, when the stroke length of the boosting piston 52 and the moving speed of the boosting piston 52 are adjusted, the position of the boosting piston 52 is preferably detected using the position sensor, and a positional signal as a detection result of the position of the boosting piston 52 is preferably used in the controller 21 for adjusting the stroke length of the boosting piston 52 or the moving speed of the boosting piston 52. Note that the speed of the boosting piston 52 can be obtained by time-differentiating the displacement of the boosting piston 52 using the position signal. That is, the position sensor can also be used as a speed sensor.

Note that the position sensor may be attached to the hydraulic cylinder 41.

As the position sensor, for example, a magnetostrictive position sensor 70 or an ultrasonic sensor can be used. Herein, a case of using the magnetostrictive position sensor will be described.

More specifically, the magnetostrictive position sensor 70 includes a sensor probe 71 (magnetostrictive line), an annular magnet 72, and a detector 73. The sensor probe 71 is provided in the cavity 48 in the vertical direction. The annular magnet 72 is attached to the upper end portion of the boosting piston 52 so as to move up and down together with the boosting piston 52 along the sensor probe 71, which is inserted in the center of the annular magnet 72. The detector 73 for detecting distortion generated in the sensor probe 71 is provided at one end of the sensor probe 71. When a current pulse signal is given to the sensor probe 71, a magnetic field in the circumferential direction centered on the sensor probe 71 is generated. At the position of the sensor probe 71 that is at the same height as the magnet 72, a magnetic field is applied in the axial direction of the sensor probe 71, leading to generation of a combined magnetic field inclined to the axial direction. This field means local torsional distortion in the sensor probe 71. The detector 73 detects the position of the magnet 72 in the height direction by detecting the torsional distortion, and outputs to the controller 21, a position signal indicating the position of the boosting piston 52 in the height direction.

A rider ring 52a and a piston ring 52b are provided at a lower portion of the boosting piston 52. The boosting piston 52 is accommodated in the cylinder liner 53 so as to be movable in the vertical direction while allowing the rider ring 52a and the piston ring 52b to be in contact with the inner wall surface of the cylinder liner 53. The rod packing portion 57 is also equipped with the rider ring 51a. Each of these rider rings 51a, and 52a has a function of correcting deflection in the horizontal direction when the boosting piston 52 moves in the vertical direction. The piston ring 52b closes a gap between the boosting piston 52 and the inner wall surface of the cylinder liner 53 and seals the pressure of the boosted liquid fuel at the leading end.

The valve box 60 is fixed to the lower portion of the cylinder liner 53 in the boosting cylinder 51. The valve box 60 includes an ejection flow path 61, an ejection valve body 62, a suction flow path 64, and a suction valve body 65.

The ejection flow path 61 is provided so as to penetrate the valve box 60 in the vertical direction. In the ejection flow path 61, the ejection valve body 62 is accommodated movably in the vertical direction. The upper end portion side of the ejection flow path 61 is a small diameter portion whose inner diameter is smaller than the outer diameter of the ejection valve body 62. At the lower opening of the small diameter portion, a valve seat 63 is formed where the ejection valve body 62 is arranged. The ejection valve body 62 and the valve seat 63 constitute an ejection valve.

An opening on the lower side of the valve box 60 of the ejection flow path 61 is provided at a position opposing the ejection port 56 of the cover 54.

The suction flow path 64 is provided at a position communicating with the position of the boosting piston 52 from the outer wall of the valve box 60. The position of the suction flow path 64 is on the upper surface of the valve box 60. An opening on the outer wall side of the valve box 60 of the suction flow path 64 is provided at a position opposing the suction port 55 of the boosting cylinder 51.

At an outer peripheral portion of the opening on the upper surface side of the valve box 60 of the suction flow path 64, a valve seat 66 is formed for the suction valve body 65, and the suction valve body 65 is movably arranged in the vertical direction above the valve seat 66. The suction valve body 65 and the valve seat 66 constitute a suction valve.

The rod packing portion 57 is connected to the cavity 48 and is sealed with a seal ring so as not to allow the gas generated from vaporized liquid fuel to leak to the outside air. The liquid fuel that leaks without being sealed by the piston ring 52b is vaporized under a low pressure and is sealed by the rod packing portion 57. In order to prevent leakage of the gas vaporized from the liquid fuel to the outside, it is allowable to supply nitrogen gas to the rod packing portion 57 instead of supplying the gas to the cavity 48.

[Operation of Linear Actuator and Reciprocating Pump]

Next, operation of the linear actuator 30 and the reciprocating pump 50 using the servo motor as the electric motor will be described.

First, the hydraulic pump 32 is driven by the electric motor 31. Subsequently, as illustrated in FIG. 2, the hydraulic fluid in the upper chamber 43a is discharged from the upper through hole 44. The hydraulic fluid passes through the first hydraulic pipe 33 and the second hydraulic pipe 34 and is supplied to the lower chamber 43b via the lower through hole 45. Then, the hydraulic piston 42 moves upward in the hydraulic fluid accommodation space 43 such that the volume of the lower chamber 43b increases and the volume of the upper chamber 43a decreases. Note that there is no branch, or the like, in the first hydraulic pipe 33 and the second hydraulic pipe, and thus, the hydraulic pump 32 directs all of the hydraulic fluid flowing out from the upper chamber 43a toward the lower chamber 43b for supply. That is, all of the hydraulic fluid discharged from the upper chamber 43a is returned toward the hydraulic pump 32 and all the hydraulic fluid returned to the hydraulic pump 32 is ejected and directed toward the lower chamber 43b for supply.

When the hydraulic piston 42 moves upward, the boosting piston 52 coupled to the lower end portion of the piston rod 47 at the coupling portion 49 rises within the cylinder liner 53. This causes the suction valve body 65 to move upward away from the valve seat 66, and the liquid fuel supplied from the suction port 55 passes through the suction flow path 64 and flows into the space inside the cylinder liner 53 at a lower portion of the boosting piston 52. At this time, the ejection valve body 62 is in a state of closing the opening of the valve seat 63.

Next, the controller 21 switches the rotational direction of the electric motor 31 to drive the hydraulic pump 32 in a direction opposite to that in FIG. 2, and as illustrated in FIG. 3, the hydraulic fluid in the lower chamber 43b is caused to be discharged from the lower through hole 45. The hydraulic fluid passes through the second hydraulic pipe 34 and the first hydraulic pipe 33 to be supplied to the upper chamber 43a from the upper through hole 44. Then, the hydraulic piston 42 moves downward in the hydraulic fluid accommodation space 43 such that the volume of the lower chamber 43b decreases and the volume of the upper chamber 43a increases. Note that there is no branch, or the like, in the first hydraulic pipe 33 and the second hydraulic pipe, and thus, the hydraulic pump 32 directs all of the hydraulic fluid flowing out from the lower chamber 43b toward the upper chamber 43a for supply. That is, all of the hydraulic fluid discharged from the lower chamber 43b is returned toward the hydraulic pump 32 and all the hydraulic fluid returned toward the hydraulic pump 32 is ejected and directed toward the upper chamber 43a for supply.

When the hydraulic piston 42 moves downward, the boosting piston 52 coupled to the lower end portion of the piston rod 47 at the coupling portion 49 moves downward within the cylinder liner 53. This causes the liquid fuel sucked into the space at a lower portion of the boosting piston 52 inside the cylinder liner 53 to push down the ejection valve body 62 to be separated from the valve seat 63, and the liquid fuel is discharged from the ejection port 56 through the ejection flow path 61. At this time, the suction valve body 65 is in a state of closing the opening of the valve seat 66.

In this manner, by switching the rotation direction of the electric motor 31 and switching the driving direction of the hydraulic pump 32, it is possible to allow the hydraulic fluid to be alternately brought back and forth between the upper chamber 43a and the lower chamber 43b, and to cause the hydraulic piston 42 and the boosting piston 52 to reciprocate in the vertical direction, and to boost the liquid fuel sucked through the suction port 55 to be ejected from the ejection port 56.

Note that in the case of the linear actuator 30 using the inverter motor for the electric motor, by switching the flow direction of the hydraulic fluid by using the direction switching valve, it is possible to allow the hydraulic fluid to be alternately brought back and forth between the upper chamber 43a and the lower chamber 43b, to allow the hydraulic piston 42 and the boosting piston 52 to reciprocate in the vertical direction, and to boost the liquid fuel sucked from the suction port 55 to be ejected from the ejection port 56.

In the present embodiment, it is possible to adjust the ejection amount of fuel ejected from the boosting cylinder 51 by adjusting the stroke length of the boosting piston 52 by controlling the linear actuator 30 by the controller 21. Note that the ejection amount of the fuel ejected from the boosting cylinder 51 is a product of the cross-sectional area of the boosting piston 52 and the moving speed at the time of ejection. Accordingly, it is possible to adjust the ejection amount of fuel ejected from the boosting cylinder 51 by adjusting the moving speed of the boosting piston 52 at ejection by the linear actuator 30. For example, the ejection amount can be adjusted according to the amount of fuel (fuel demand) needed by the internal combustion engine 90.

For example, when the speed of the ship is low in a port, or the like, and the load is low, the rotation speed of the internal combustion engine 90 is decreased (for example, to 60 rpm). At this time, the ejection amount of the fuel ejected from the boosting cylinder 51 is adjusted such that the pressure measured by the pressure gauge 17 becomes a relatively low pressure (for example, 20 MPa).

In contrast, for example, when the speed of the ship is high in the open ocean, or the like, and the load is high, the rotation speed of the internal combustion engine 90 is increased (for example, to 120 rpm). At this time, the ejection amount of the fuel ejected from the boosting cylinder 51 is adjusted such that the pressure measured by the pressure gauge 17 becomes a relatively high pressure (for example, 70 MPa).

Even in cases other than the above, in order to adjust the rotation speed of the internal combustion engine 90 in accordance with the load, the ejection amount of the fuel ejected from the boosting cylinder 51 is adjusted so as to set the pressure measured by the pressure gauge 17 to be the pressure corresponding to the desired rotation speed.

To adjust the ejection amount, there is, for example, a method of adjusting the time length of one reciprocating cycle, timing, or stroke length of the boosting piston 52. For example, by doubling the stroke length of the boosting piston 52, it is possible to double the fuel ejection amount per cycle from the reciprocating pump 50.

Herein, the stroke is a height from a lowermost point to an uppermost point at the time of reciprocation of the boosting piston 52 in the up-down direction. The stroke is set from the lowermost position of the boosting piston 52 in the cylinder liner 53. The lowermost position of the boosting piston 52 is a position where the volume of the space below the boosting piston 52 inside the cylinder liner 53 is minimized. By adjusting the stroke length on the basis of this position, all the liquid fuel in the reciprocating pump 50 is ejected in individual cycles regardless of the setting of the stroke.

Moreover, by adjusting the speed and the stroke length of the boosting piston 52, it is possible to adjust the time length or the timing of ejection of the fuel from the boosting cylinder 51. For example, by doubling the stroke length while maintaining the speed of the boosting piston 52 constant, it is possible to double the ejection time while maintaining the ejection amount of fuel per unit time from the reciprocating pump 50 to be constant.

Moreover, when one suction and one ejection are set as one cycle, it is possible to adjust the ejection amount while maintaining the time of one cycle to be constant by adjusting the ratio of the ejection time and the suction time. In other words, the controller 21 controls the linear actuator 30 so as to adjust the amount of liquid fuel ejected from the boosting cylinder 51 per reciprocating time of the boosting piston 52 (value obtained by dividing the amount of ejected liquid fuel by the reciprocating time) by adjusting the ratio of the ejection time and the suction time of the liquid fuel by the reciprocating pump 50 without changing the reciprocating time of the boosting piston 52 in accordance with the load of the internal combustion engine 90.

Furthermore, the control unit 80 controls, via the controller 21, the linear actuator 30 so as to change the total amount of liquid fuel ejected from each of the boosting cylinders 51 per reciprocating time (value obtained by dividing the total by the reciprocating time) by adjusting the ratio of the ejection time and the suction time of the liquid fuel by the reciprocating pump 50 without changing the reciprocating time of the boosting piston 52 (while maintaining the time of one cycle to be constant) in accordance with the load of the internal combustion engine 90.

At this time, adjustment of the ratio of the ejection time and the suction time of the liquid fuel is performed by adjusting the stroke length of the boosting piston 52 and the moving speed of the boosting piston 52 at the time of ejection (moving speed of the boosting piston 52 in the descending direction in the example illustrated in FIGS. 2 and 3) in accordance with the load of the internal combustion engine 90.

Figure 4:
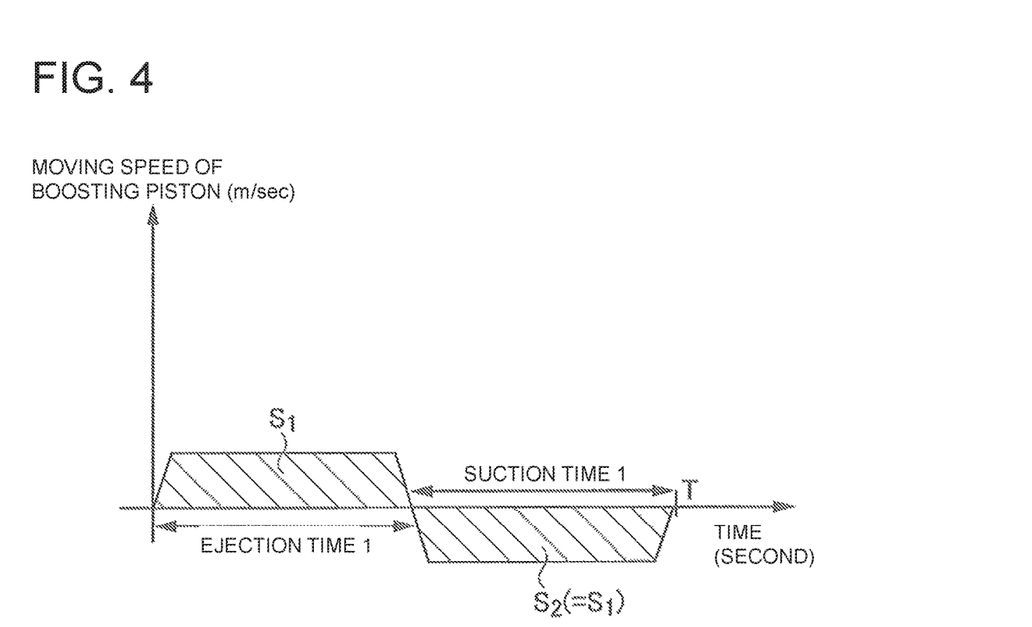
FIG. 4 is a diagram illustrating an example of a moving speed of a boosting piston according to a present embodiment.
Figure 5:
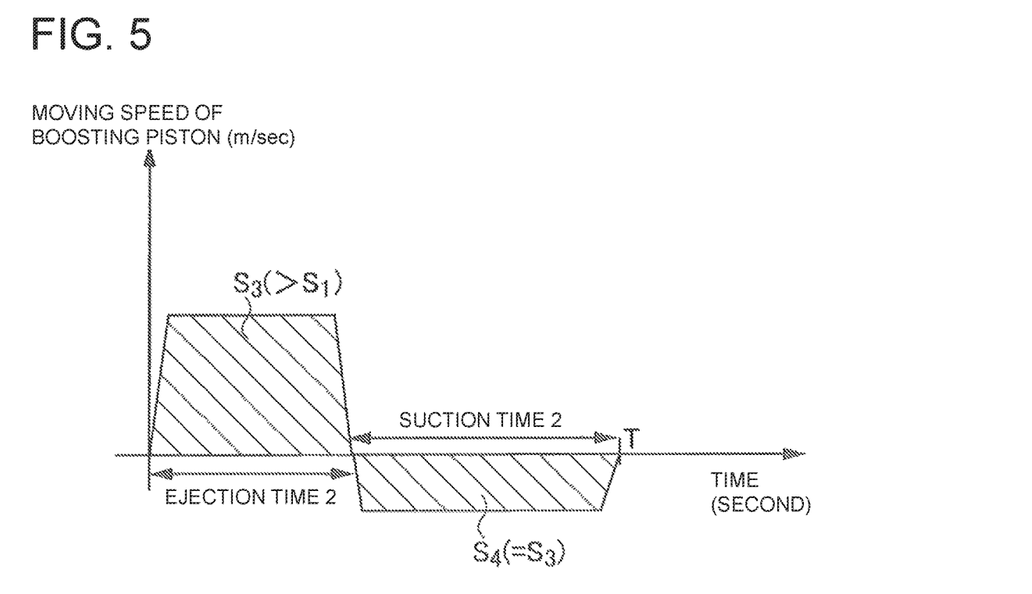
FIG. 5 is a diagram illustrating another example of a moving speed of a boosting piston according to a present embodiment.

FIGS. 4 and 5 are diagrams illustrating an example of the moving speed of the boosting piston 52. The example illustrated in FIG. 4 illustrates a state where ejection time 1 and suction time 1 are equal since the moving speed of the boosting piston 52 at the time of ejection and at the time of suction are the same. In the example illustrated in FIG. 5, the stroke length of the boosting piston 52 is set to be larger than the stroke length in the example illustrated in FIG. 4 (hatched area $S_1$ illustrated in FIG. 4<hatched area $S_3$ illustrated in FIG. 5), thereby setting the moving speed of the boosting piston 52 at ejection to be higher compared with the moving speed in the example illustrated in FIG. 4. In this case, the moving speed of the boosting piston 52 at the time of suction is lower than the moving speed in the example illustrated in FIG. 4. As a result, ejection time 2 is shorter than suction time 2.

In the example illustrated in FIG. 5, the moving speed of the boosting piston 52 at the time of ejection is adjusted to be high and the stroke length of the boosting piston 52 is adjusted to be increased compared with the example illustrated in FIG. 4. Alternatively, however, it is also possible to adjust the moving speed of the boosting piston 52 at the time of ejection to be low by decreasing the stroke length of the boosting piston 52 to be smaller compared with the example illustrated in FIG. 4. Such adjustment is performed in accordance with the load of the internal combustion engine 90.

Since the plurality of fuel supply units 20A, 20B, and 20C can be controlled independently, the number of fuel supply units operating in accordance with the fuel demand of the internal combustion engine 90 can also be changed.

Moreover, since the plurality of fuel supply units 20A, 20B, and 20C can be controlled independently, it is possible adjust the speed and position of each of the boosting pistons 52 such that the total value of the pressures of the liquid fuel ejected from the fuel supply units 20A, 20B, and 20C to the high pressure fuel supply pipe 13 becomes constant. For example, in a case where the two fuel supply units 20A and 20B are used, by adjusting the speed of each of the boosting pistons 52 such that an increase amount in the pressure of the liquid fuel ejected from the fuel supply unit 20A to the high pressure fuel supply pipe 13 is equal to an decrease amount in the pressure of the liquid fuel ejected from the fuel supply unit 20B to the high pressure fuel supply pipe 13, it is possible to set the pressure of the liquid fuel to be ejected to the high pressure fuel supply pipe 13 to be constant and to prevent pulsation.

Moreover, by providing a position sensor for detecting the position of the boosting piston 52 in the vertical direction, it is possible to reliably adjust the speed and position of the boosting piston 52.

Moreover, in this embodiment, since the hydraulic piston 42 and the boosting piston 52 are moved in the vertical direction, the hydraulic cylinder 41 and the boosting cylinder 51 also receive a force in the vertical direction as reaction. This suppress a force acting in the horizontal direction on the installation site of the hydraulic cylinder 41 and the boosting cylinder 51 even when the hydraulic piston 42 and the boosting piston 52 are driven, making it possible to easily fix the hydraulic cylinder 41 and the boosting cylinder 51. Moreover, it is possible to reduce the floor area needed for installing the hydraulic cylinder 41 and the boosting cylinder 51.

Moreover, since the hydraulic piston 42 and the boosting piston 52 are moved in the vertical direction, no local wear is generated in the piston rings 42b and 52b and the rider rings 51a and 52a.

Moreover, in the case of using a servo motor, it is possible to switch the moving direction of the hydraulic piston 42 by switching the flow direction of the hydraulic fluid to be supplied into the hydraulic cylinder 41 in accordance with the direction of forward/reverse rotation of the hydraulic pump 32. In this case, since the flow direction of the hydraulic fluid is not switched by any direction switching valve, there is no need to continuously drive the hydraulic pump 32 at a rated rotation speed. This makes it possible to reduce energy consumption compared with the case where the hydraulic pump 32 is continuously drive at the rated rotation speed.

Moreover, since the plurality of fuel supply units 20A, 20B, and 20C are provided in parallel with each other between the low pressure fuel supply pipe 12 and the high pressure fuel supply pipe 13, the number of fuel supply units can be easily changed. Moreover, even when trouble occurs in any one of the plurality of fuel supply units or maintenance is performed, it is possible to remove the corresponding fuel supply unit while continuously driving other fuel supply units.

Moreover, since the plurality of fuel supply units 20A, 20B, and 20C can be controlled independently, the number of fuel supply units operating in accordance with the fuel demand of the internal combustion engine 90 can also be changed.

Moreover, by providing a position sensor for detecting the position of the boosting piston 52 in the vertical direction, it is possible to reliably adjust the speed and position of the boosting piston 52.

Note that while the above description is the case of using three fuel supply units 20A, 20B, and 20C, the present technology is not limited to this, and any number of fuel supply units can be used. Moreover, the shape of the reciprocating pump 50 is not limited to the one illustrated in FIGS. 2 and 3, but a reciprocating pump having an arbitrary shape can be used.

Moreover, while the above description is a case of the fuel supply device mounted on a ship, the present technology is not limited to this. The linear actuator 30 and the reciprocating pump 50 can be installed on any structure. For example, the linear actuator 30 and the reciprocating pump 50 may be mounted on a vehicle body of an automobile, or the linear actuator 30 and the reciprocating pump 50 may be installed on a floor of a building frame.

Modification Example

Figure 6:
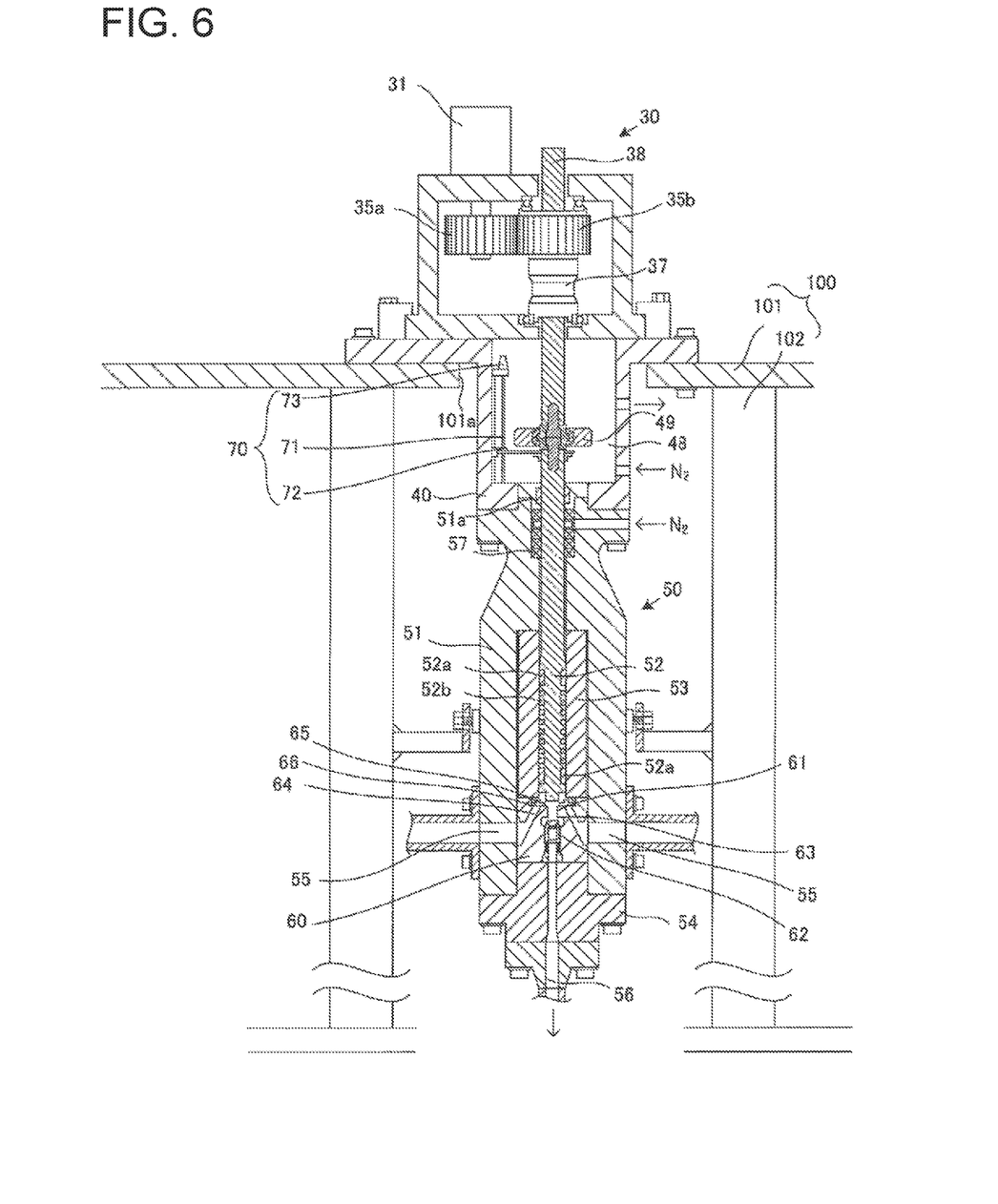
FIG. 6 is a diagram illustrating a fuel supply unit using an electric cylinder unit as the linear actuator according to a present embodiment.

FIG. 6 is a diagram illustrating a fuel supply unit using an electric cylinder unit as the linear actuator 30. Note that the same reference numerals are given to the configurations similar to the configurations in FIGS. 2 and 3 and description thereof will be omitted.

The electric cylinder unit includes an electric motor 31, gears 35a and 35b, a ball nut 37, and a ball screw 38.

The gear 35a is rotated by the power of the electric motor 31, and the rotation of the gear 35a is transmitted to the gear 35b.

The gear 35b is provided integrally with the ball nut 37, and transmits the rotation of the gear 35a to the ball nut 37.

The ball nut 37 is screwed with the ball screw 38 and rotates together with the gear 35b.

The lower end of the ball screw 38 is coupled to the upper end of the boosting piston 52 via the coupling portion 49. Rotation of the ball nut 37 causes the ball screw 38 to move in the axial direction. Movement of the ball screw 38 in the axial direction causes the boosting piston 52 to move in the axial direction.

In this modification example, it is possible to achieve an effect similar to the case of using the hydraulic cylinder unit as the linear actuator 30.

In a case where the pump installation location is a non-explosion-proof location or in a Zone-2 (Class I Division 2) hazard location, the rotation of the electric motor 31 may be transmitted to the ball nut using a pulley and a timing belt instead of the gears 35a and 35b.

The invention claimed is:

1. A fuel supply device for supplying fuel into a combustion chamber of an internal combustion engine, the fuel supply device comprising:
   a linear actuator;
   a reciprocating pump having a boosting cylinder and a boosting piston driven by the linear actuator and configured to reciprocate in an axial direction, the reciprocating pump being configured to suck the fuel into the boosting cylinder when the boosting piston moves in a first direction in the axial direction and configured to boost and eject the fuel from the boosting cylinder when the boosting piston moves in a second direction in the axial direction; and
   a controller configured to control driving of the linear actuator, the controller being configured to control the linear actuator so as to adjust an amount of the fuel ejected from the boosting cylinder per reciprocating time by adjusting a ratio of a fuel ejection time and a fuel suction time of the reciprocating pump without changing the reciprocating time of the boosting piston in accordance with a load of the internal combustion engine, and configured to perform adjustment of the ratio of the fuel ejection time and the fuel suction time by adjusting a stroke length of the boosting piston and a moving speed of the boosting piston in the second direction in accordance with the load of the internal combustion engine.

2. The fuel supply device according to claim 1, wherein the control unit is configured to adjust a timing at which fuel is ejected from the boosting cylinder by adjusting the moving speed of the boosting piston in the second direction and the stroke length of the boosting piston.

3. The fuel supply device according to claim 1, wherein the stroke length is adjusted to be a length corresponding to a fuel amount needed by the internal combustion engine.

4. The fuel supply device according to claim 1,
wherein the linear actuator is a hydraulic cylinder unit, the hydraulic cylinder unit including:
   a hydraulic cylinder having a hydraulic fluid accommodation space for accommodating hydraulic fluid and arranged such that an axial direction of the hydraulic cylinder is aligned with the axial direction of the boosting piston;
   a hydraulic piston movably arranged in the axial direction within the hydraulic cylinder, and configured to partition the hydraulic fluid accommodation space into a first chamber and a second chamber;
   a piston rod configured to couple the hydraulic piston with the boosting piston;
   a hydraulic pump configured to move the hydraulic piston in a first direction in the axial direction by supplying hydraulic fluid to the first chamber and to move the hydraulic piston in a second direction in the axial direction by supplying hydraulic fluid to the second chamber; and
   an electric motor configured to drive the hydraulic pump such that the hydraulic piston reciprocates in the axial direction, and
   the controller is configured to control a movement of the hydraulic piston within the hydraulic cylinder by controlling the electric motor.

5. The fuel supply device according to claim 4,
wherein the hydraulic cylinder unit further includes:
   a first hydraulic pipe with an internal space closed therein, the first hydraulic pipe having one end connected to the hydraulic pump and an other end connected to the first chamber and configured to direct all the hydraulic fluid ejected from the hydraulic pump toward the first chamber for supply and configured to return all the hydraulic fluid discharged from the first chamber toward the hydraulic pump; and
   a second hydraulic pipe with an internal space closed therein, the second hydraulic pipe having one end connected to the hydraulic pump and an other end connected to the second chamber and configured to direct all the hydraulic fluid ejected from the hydraulic pump toward the second chamber for supply and configured to return all the hydraulic fluid discharged from the second chamber toward the hydraulic pump, and
   the hydraulic pump is configured to direct all the hydraulic fluid returned to the hydraulic pump toward one of the first chamber and the second chamber for supply.

6. The fuel supply device according to claim 1, further comprising a position sensor for detecting a position of the boosting piston.

7. The fuel supply device according to claim 1,
wherein the linear actuator is an electric cylinder unit, and includes:
   an electric motor;
   a ball nut configured to rotate by a power of the electric motor; and
   a ball screw to which the ball nut is screwed, being coupled with the boosting piston, an axial direction of the ball screw being aligned with the axial direction of the boosting piston, and configured to move in the axial direction of the ball screw by rotation of the ball nut, and the controller is configured to control a movement of the ball screw in the axial direction by controlling the electric motor.

8. The fuel supply device according to claim 1, wherein the controller is further configured to adjust a length of the fuel ejection time without changing the reciprocating time of the boosting piston in accordance with the load of the internal combustion engine, to adjust the ratio.

9. A fuel supply device for supplying fuel into a combustion chamber of an internal combustion engine, the fuel supply device comprising:

a low pressure fuel supply pipe configured such that a low pressure fuel is supplied;

a high pressure fuel supply pipe configured such that high pressure fuel to be supplied into the combustion chamber is supplied;

a plurality of fuel supply units provided between the low pressure fuel supply pipe and the high pressure fuel supply pipe, each of the fuel supply units being configured to boost the fuel in the low pressure fuel supply pipe and supply the boosted fuel to the high pressure fuel supply pipe; and a control unit configured to control the plurality of fuel supply units, each of the fuel supply units including:

a linear actuator;

a reciprocating pump having a boosting cylinder and a boosting piston driven by the linear actuator and configured to reciprocate in an axial direction, the reciprocating pump being configured to suck the fuel into the boosting cylinder when the boosting piston moves in a first direction in the axial direction and configured to boost and eject the fuel from the boosting cylinder when the boosting piston moves in a second direction in the axial direction; and a controller configured to control driving of the linear actuator, the control unit being configured to control, via the controller, the linear actuator so as to change a total amount of the fuel ejected from each boosting cylinder per reciprocating time by adjusting a ratio of a fuel ejection time and a fuel suction time of the reciprocating pump without changing the reciprocating time of the boosting piston in accordance with a load of the internal combustion engine, and configured to perform, via the controller, adjustment of the ratio of the fuel ejection time and the fuel suction time by adjusting a stroke length of the boosting piston and a moving speed of the boosting piston in the second direction in accordance with the load of the internal combustion engine.

10. The fuel supply device according to claim 9, wherein at least one stroke length of the boosting piston is adjusted to be different from a stroke length of another boosting piston.

11. The fuel supply device according to claim 9, wherein the control unit is further configured to adjust a length of the fuel ejection time without changing the reciprocating time of the boosting piston in accordance with the load of the internal combustion engine, to adjust the ratio.

12. A fuel supply method for supplying fuel into a combustion chamber of an internal combustion engine, the method comprising the steps of:

allowing reciprocating movement of a boosting piston driven by a linear actuator in an axial direction, sucking the fuel into a boosting cylinder when the boosting piston moves in a first direction in the axial direction, and boosting and ejecting the fuel from the boosting cylinder when the boosting piston moves in a second direction in the axial direction; and adjusting an amount of the fuel ejected from the boosting cylinder per reciprocating time of the boosting piston in accordance with a load of the internal combustion engine by adjusting a ratio of a fuel ejection time and a fuel suction time without changing the reciprocating time, the ratio of the fuel ejection time and the fuel suction time being adjusted by adjusting, through the linear actuator, a stroke length of the boosting piston and a moving speed of the boosting piston in the second direction in accordance with the load of the internal combustion engine.

13. The fuel supply method according to claim 12, wherein a timing at which fuel is ejected from the boosting cylinder is adjusted by adjusting the moving speed of the boosting piston in the second direction and the stroke length of the boosting piston.

14. The fuel supply method according to claim 12, wherein the linear actuator is a hydraulic cylinder unit, the hydraulic cylinder unit including:

a hydraulic cylinder having a hydraulic fluid accommodation space for accommodating hydraulic fluid and arranged such that the axial direction of the hydraulic cylinder is aligned with the axial direction of the boosting piston;

a hydraulic piston movably arranged in the axial direction within the hydraulic cylinder, and configured to partition the hydraulic fluid accommodation space into a first chamber and a second chamber;

a piston rod configured to couple the hydraulic piston with the boosting piston;

a hydraulic pump configured to move the hydraulic piston in a first direction in the axial direction by supplying hydraulic fluid to the first chamber and to move the hydraulic piston in a second direction in the axial direction by supplying hydraulic fluid to the second chamber; and an electric motor configured to drive the hydraulic pump such that the hydraulic piston reciprocates in the axial direction, and the step of boosting and ejecting the fuel includes controlling a movement of the hydraulic piston within the hydraulic cylinder by controlling the electric motor.

15. The fuel supply method according to claim 14, wherein the step of boosting and ejecting the fuel includes:

returning all the hydraulic fluid discharged from the second chamber toward the hydraulic pump and ejecting and directing all the hydraulic fluid returned toward the hydraulic pump to the first chamber for supply; and returning all the hydraulic fluid discharged from the first chamber toward the hydraulic pump and ejecting and directing all the hydraulic fluid returned to the hydraulic pump to the second chamber for supply.

16. The fuel supply method according to claim 12, wherein a position of the boosting piston is detected when adjusting the stroke length of the boosting piston and the moving speed of the boosting piston, and a detection result of the position of the boosting piston is used for adjusting one of the stroke length of the boosting piston and the moving speed of the boosting piston.

17. A fuel supply method for supplying fuel into a combustion chamber of an internal combustion engine, the method comprising the steps of:

allowing reciprocating movements of boosting pistons driven by a plurality of linear actuators respectively in an axial direction, sucking the fuel into boosting cylinders respectively when the boosting pistons move in a first direction in the axial direction, and boosting and ejecting the fuel from the boosting cylinders respectively when the boosting pistons move in a second direction in the axial direction; and changing a total amount of the fuel ejected from the boosting cylinders per reciprocating time of the boosting pistons in accordance with a load of the internal combustion engine by adjusting, by controlling at least one of the linear actuators, a ratio of a fuel ejection time and a fuel suction time without changing the reciprocating time of the boosting pistons, the ratio of the fuel ejection time and the fuel suction time being adjusted by adjusting a stroke length of at least one of the boosting pistons and a moving speed of at least one of the boosting pistons in the second direction in accordance with the load of the internal combustion engine.

18. The fuel supply method according to claim 17, wherein at least one stroke length of the boosting pistons is adjusted to be different from a stroke length of another boosting piston.

19. The fuel supply method according to claim 12, wherein the ratio is adjusted by further adjusting a length of the fuel ejection time without changing the reciprocating time of the boosting piston in accordance with the load of the internal combustion engine.

20. The fuel supply method according to claim 17, wherein the ratio is adjusted by further adjusting a length of the fuel ejection time without changing the reciprocating time of the boosting piston in accordance with the load of the internal combustion engine.

* * * * *